(No Model.)
E. H. RYON.
SPINDLE BEARING.
No. 597,690. Patented Jan. 18, 1898.
Fig. 1.
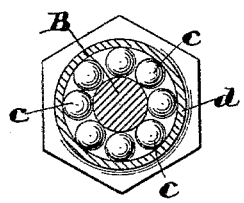
Fig. 2.
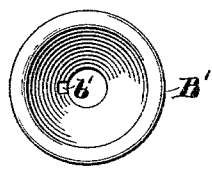
Fig. 3.
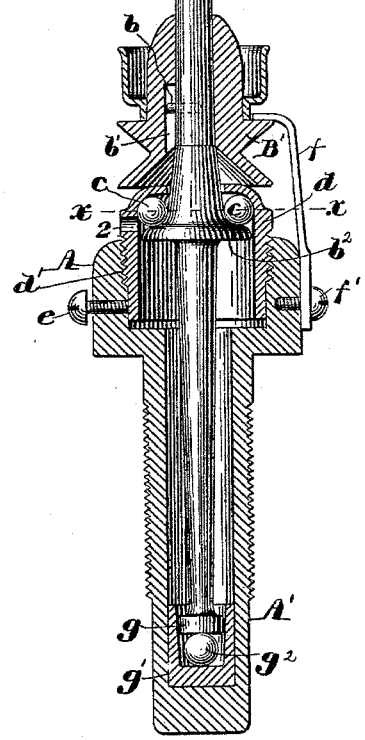
Witnesses:
Walter E. Lombard
Edward F. Allen
Inventor:
Eppa H. Ryon,
by Crosby & Gregory Attys.
THE NORRIS PETERS CO., PHOTO-LITHO., WASHINGTON, D. C.

UNITED STATES PATENT OFFICE.

EPPA H. RYON, OF WALTHAM, MASSACHUSETTS, ASSIGNOR OF ONE-HALF TO A. M. GOODALE, OF SAME PLACE.

SPINDLE-BEARING.

SPECIFICATION forming part of Letters Patent No. 597,690, dated January 18, 1898.

Application filed October 26, 1896. Serial No. 610,063. (No model.)

*To all whom it may concern:*

Be it known that I, EPPA H. RYON, of Waltham, county of Middlesex, State of Massachusetts, have invented an Improvement in Spindle-Bearings, of which the following description, in connection with the accompanying drawings, is a specification, like letters and figures on the drawings representing like parts.

This invention has for its object the production of a bearing for a spinning-spindle, the said bearing being constructed to reduce the friction between it and the spindle to the minimum.

In my improved bearing I employ a series of balls which are acted upon at one side by an outwardly-tapered or cone-shaped flange secured to the spindle, said balls at a point directly opposite their point of contact with the flange of the spindle rolling in and against a cover or device having a ball-seat, the said balls thus acting to resist the band pull. The balls are kept pressed against the conical surface of the flange by a surrounding cover or device having a ball-seat, it being shown as made adjustable.

The use of the balls in the manner herein provided for makes it possible to do away with the usual bolster or lateral bearing commonly used in connection with vertical spindles. The foot of the spindle will also preferably rest on a ball or equivalent small support presenting but little surface for friction.

I have shown the step-case which receives the ball as having a conical cavity which receives a small cone-shaped flange attached to the lower extremity or foot of the spindle. I have also shown the whirl as attached to the spindle by a pin-and-slot connection.

Figure 1 shows a spindle in a bearing represented in section, said bearing illustrating my invention; Fig. 2, a section below the line $x$, Fig 1; and Fig. 3 shows the lower end of the whirl.

The supporting-case A has a threaded shank A', adapted to be put through a hole in the spindle-rail, (not shown,) the threaded shank thereafter receiving a nut (not shown) by which to seat the said case in the usual manner.

The spindle B, as shown, has a pin $b$, which engages a slot $b'$ in the whirl B', so that the said whirl may be slipped off and onto the spindle, when desired, over the top of its blade. The spindle has a flange or collar $b^2$, which receives upon its upper side and supports a series of balls $c$, said balls being embraced by a cover $d$, having a threaded shank $d'$ to enter screw-threads cut in the interior wall of the upper chamber of the supporting-case, said cover having a central orifice or hole to surround loosely the spindle, an inturned or lipped portion of the said cover bearing on the said balls. After the cover has been adjusted into its proper position to correctly seat the balls it may be secured in such position, as by a suitable fastening device, herein shown as a set-screw $e$.

The whirl is kept down in working position by a whirl-stop $f$, shown as an arm with a lip, said arm being fastened to the support by a suitable screw $f'$.

The lower end or foot of the spindle is shown as provided with a small cone-shaped flange $g$, it entering a conical cavity in a step $g'$, the said step receiving the ball $g^2$, on which rests the lower extremity or foot of the spindle. The ball $g^2$ sustains the weight of the spindle, and the ball $c$, besides sustaining the spindle in position against the band pull, also receives the wear due to rotation of the spindle. The balls present freely-rolling surfaces and serve as a lateral bearing which presents the minimum of friction and enables the usual bolster or lateral bearing, made as a tube, to be dispensed with. The balls $c$ also present freely-rolling surfaces to receive and resist any tendency of the spindle to rise in its rotation.

The cover has an oil-hole 2 to enable a lubricant to be interposed, if desired, between the balls and the spindle or its flange if it should be considered that oil is necessary. I contemplate, however, that my spindle, with the bearings described, can be used to advantage without oil or any lubricant.

To assemble the parts, the balls $c$ may be first put into the inverted cover, the central opening being kept closed, and then the spindle-blade may be put through the central opening of the cover, leaving the balls outside the spindle and supporting the flange.

After this the spindle and cover thereon may be placed right side up and the foot of the spindle be put onto the supporting-case, screwing the cover in place, and thereafter, or at any time after putting the spindle in the cover, as described, the whirl may be added.

In my invention the balls $c$ act directly against a tapering or cone-shaped surface connected to or forming part of a flange attached to the blade of the spindle, said flange presenting a taper greater than the taper of the spindle-blade. Coöperating with said tapering flange and, as herein shown, located between the usual whirl and the flange I place the stationary cover or device $d$, having a ball seat or track, and, as I have shown in the accompanying drawings, the action of the flange is to roll the balls on the seat freely, which would not be the case if the balls were acted upon at their inner and outer sides by moving surfaces traveling at different speeds in the same direction, the said balls also acting against a third or stationary surface.

I herein disclaim a spindle-bearing in which the balls are acted upon at their inner and outer sides by two surfaces moving in the same direction at different speeds.

Having described my invention, what I claim, and desire to secure by Letters Patent, is—

1. A spinning-spindle provided at a point below the junction of the spindle and its whirl with a cone-shaped flange tapered outwardly, and an independent whirl attached to said spindle, combined with a supporting-case provided with a cover or device containing a ball-seat, and a series of balls in contact with said flange and bearing against the said seat, substantially as described.

2. A spinning-spindle provided at a point below its whirl with a cone-shaped flange tapered outwardly, and a whirl secured to said spindle, combined with a supporting-case, provided with a cover or device containing a ball-seat interposed between said flange and the lower end of the whirl, and a series of balls in contact with said flange and bearing against the said seat, substantially as described.

3. A spinning-spindle provided at a point below its whirl with a cone-shaped flange tapered outwardly, and an independent whirl attached to said spindle, combined with a supporting-case provided with a vertically-adjustable cover or device containing a ball-seat, and a series of balls in contact with said flange and bearing against the said seat, substantially as described.

4. A supporting-case, an adjustable cover provided with a central opening, a spindle standing in said opening and provided with a flange, a step for said spindle, a series of balls between said flange and said cover, and means to hold said cover in its adjusted position, substantially as described.

5. A spindle having its foot provided with a cone-shaped enlargement, a step having a conical cavity and entered by said enlargement, and a ball to support the foot of the spindle in said step, substantially as described.

6. A spindle provided with a flange, a series of balls resting on said flange, a cover embracing said spindle and covering said balls to keep them on said flange, and a supporting-case to hold said cover, combined with a whirl detachably secured to said spindle, substantially as described.

7. A supporting-case, a vertical spindle mounted therein and provided with a flange, a ball to sustain the foot of said spindle, and a whirl connected with said spindle, combined with a supporting-case, a connected cover surrounding said spindle, and a series of balls interposed between the said cover and the flange of the spindle and constituting a rolling lateral bearing therefor to resist the strain of the band pull, substantially as described.

8. A spinning-spindle provided with a whirl having a band-groove, and a cone-shaped ball-supporting flange also secured to said spindle and extended outwardly therefrom in a horizontal plane wholly without the plane of the band-groove of said whirl, combined with a supporting-case, a cover or device sustained thereby and containing a ball-seat, and a series of balls interposed between said flange and said cover, to operate substantially as described.

In testimony whereof I have signed my name to this specification in the presence of two subscribing witnesses.

EPPA H. RYON.

Witnesses:
CAROLINE M. JACOBSEN,
WILLIAM H. JOHNSON.